Nov. 3, 1931.    F. L. MORSE    1,830,237
SOUND ANALYZING DEVICE
Filed March 20, 1929

INVENTOR
FRANK L. MORSE
BY
ATTORNEY

Patented Nov. 3, 1931

1,830,237

UNITED STATES PATENT OFFICE

FRANK L. MORSE, OF ITHACA, NEW YORK

SOUND ANALYZING DEVICE

Application filed March 20, 1929. Serial No. 348,637.

This invention relates to sound detecting apparatus, and is particularly useful in locating and studying the noises emanating from moving parts of machinery. In many places, such as testing rooms for automobile motors, there are many conflicting noises present, and yet it may be very important to listen to, observe and measure the amount of sound from some particular moving part at some particular stage of its action. Listening sticks have been used, but these are not satisfactory where they cannot be placed in direct mechanical contact with the part being studied. For example, it may be desired to study the noise made by a chain running on a sprocket, such as the cam shaft drive of an automobile engine, where there are dozens of other noises present, and the particular noise to be studied is that made by the running chain at the instant of engagement with the sprocket teeth. Under such conditions a listening stick is of little use, and neither is the ordinary microphonic or stethoscopic apparatus, since it tends to pick up too much sound from various sources. Prior apparatus has been chiefly concerned with picking up the desired sound; I have discovered that the best results are obtained chiefly by excluding sound and taking a relatively small amount of sound from close to the part to be studied thru a flexible tube having a small orifice and conducting it to a microphone transmitter which is well insulated on all sides from other sounds, and then amplifying the electrical vibrations so that they can be visually observed and compared and/or audibly studied. Conflicting sounds are eliminated to a degree not possible with other apparatus, so that the particular sound being studied is made more definite; and I have then found it possible, by using several stages of amplification, to obtain a substantially definite reading on ordinary electrical measuring instruments proportional to the volume or amount of sound detected, capable of comparison quantitatively with other machines, or a standard sound source.

Figure 1:
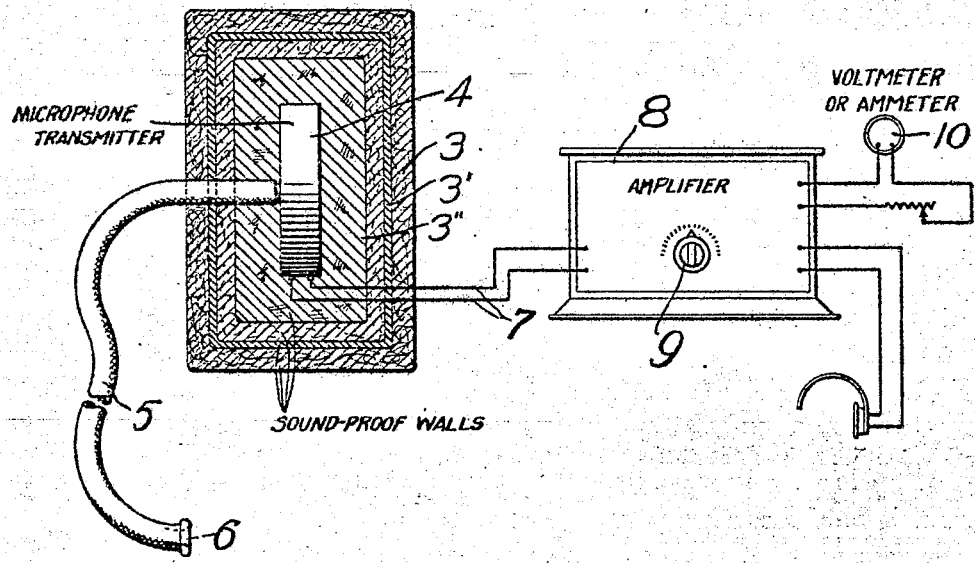
Figure 2:
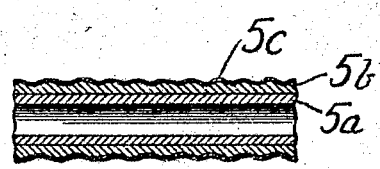

Referring now to the drawings, Fig. 1 is a general view, partly in section, illustrating one preferred form of the invention; and Fig. 2 is a longitudinal cross-section of a part of a modified form of sound conducting tube which may be used.

Referring now to Fig. 1, the reference numeral 4 indicates a microphone transmitter which is encased in a number of sound proof walls 3, 3', 3", etc. which surround and enclose the transmitter 4 on all sides, except for a small orifice where the tube 5 leads into the transmitter 4. The walls 3, 3', etc., may be made of any suitable sound-proof material, such as sponge rubber, cork, felt, or special materials, and serve to protect the transmitter 4 from substantially all sound vibrations except those that reach it thru the tube 5. The tube 5 is long enough and flexible enough so that it can reach to the desired point in the machinery to be tested, and is usually made simply of rubber tubing or hose. It will be noted that there is no pronounced bell or horn at the end of the tube, the orifice 6 being substantially the same as the hole in the tube 5, instead of having a relatively large collector as has been customary.

Various other forms of tube may be used,— for example, in Fig. 2 a multiple-walled tube construction is shown having inner tubes 5a and 5b of sound absorbing material such as rubber and an outer wall 5c of hard sound reflecting material such as flexible metal tubing. In general the purpose is to transmit to the microphone 4 only the sound waves that enter the tube thru the open end or orifice 6, and exclude other sound vibrations.

Conductors 7 connect the transmitter 4 to the amplifier set 8 of the usual audion or vacuum tube type, having a power regulating dial 9. The invention is not restricted to any one design or type of amplifier, as will be obvious to those skilled in the art, and the degree of amplification used will vary according to the character of the sound being studied and also according to the type of receiving devices used,—which may be either a telephone receiver or head set or loud speaker if the sound is to be listened to, or a voltmeter or ammeter 10 if the sound is to be quantitatively measured, or a visual indicator of the oscillograph type, or any of these in combination.

I have in the foregoing shown and described the invention in a preferred form, but it will be understood that this is merely by way of illustration to make clear the principle thereof, and that the invention is not limited to that specific embodiment but is susceptible to various modifications and adaptations in different installations as will be apparent to those skilled in the art without departing from the scope thereof as set forth in the following claims.

I claim:

1. In sound analyzing apparatus, a sound wave responsive device having indicating mechanism associated therewith and means for conducting sound waves from a source thereof to said device, said means including a flexible tube, of relatively small substantially uniform diameter throughout its length having one end open and arranged to deliver sound waves to said device and the other end open and movable to positions in proximity with respect to said source.

2. In sound analyzing apparatus, a sound wave responsive device having indicating mechanism associated therewith and means for conducting sound waves from a source thereof to said device, said means including a flexible tube, of relatively small diameter with a movable open end of relatively small area as compared to the sound source, whereby the effect, on said device, of any undesired sound waves is maintained at a relatively low value as compared to the effect of the waves emitted from said source.

In testimony whereof I have hereunto set my name this 18th day of March, 1929.

FRANK L. MORSE.